(12) United States Patent
Klaffert (10) Patent No.: US 10,048,463 B2
(45) Date of Patent: Aug. 14, 2018

(54) ADJUSTABLE MOUNTING ARRANGEMENT FOR AN OBJECT TO BE POSITIONED PRECISELY RELATIVE TO A BASE

(71) Applicant: MBDA Deutschland GmbH, Schrobenhausen (DE)

(72) Inventor: Thomas Klaffert, Freising (DE)

(73) Assignee: MBDA Deutschland GmbH, Schrobenhausen (DE)

( * ) Notice: Subject to any disclaimer, the term of this patent is extended or adjusted under 35 U.S.C. 154(b) by 30 days.

(21) Appl. No.: 15/031,964

(22) PCT Filed: Oct. 28, 2014

(86) PCT No.: PCT/DE2014/000544
§ 371 (c)(1),
(2) Date: Apr. 25, 2016

(87) PCT Pub. No.: WO2015/062568
PCT Pub. Date: May 7, 2015

(65) Prior Publication Data
US 2016/0274329 A1 Sep. 22, 2016

(30) Foreign Application Priority Data

Oct. 28, 2013 (DE) .................. 10 2013 017 874
Oct. 28, 2013 (DE) .................. 20 2013 011 930 U (51) Int. Cl.
*G02B 5/08* (2006.01)
*G02B 7/182* (2006.01)
(Continued)

(52) U.S. Cl.
CPC ............ *G02B 7/182* (2013.01); *G02B 7/183* (2013.01); *G02B 7/1827* (2013.01); *G02B 23/02* (2013.01)

(58) Field of Classification Search
CPC .......... G02B 23/02; G02B 7/182; G02B 5/08; G02B 7/183; G02B 23/2476; G02B 7/028; G02B 7/1822; G02B 7/1827
(Continued)

(56) References Cited

U.S. PATENT DOCUMENTS 6,402,329 B1 6/2002 Bailly et al.
6,404,547 B1 6/2002 Hull
2011/0310502 A1 12/2011 Blanchard et al.

FOREIGN PATENT DOCUMENTS

DE 602 01 429 T2 11/2005
JP 2001-318301 A 11/2001
(Continued)

OTHER PUBLICATIONS

PCT/DE20104/000544, International Search Report dated Feb. 19, 2015 (Two (2) pages).

*Primary Examiner* — Jade R Chwasz
(74) *Attorney, Agent, or Firm* — Crowell & Moring LLP (57) ABSTRACT

An adjustable mounting arrangement to position an object of an optical reflecting telescope relative to a base includes at least two support structures connected to the base and to the object. Each of the at least two support structures has two four-link beams arranged nonparallel to each other and a cradle having two connecting links. Each of the two four-link beams has a first strut and a second strut running nonparallel to each other, where each of the first and second struts have a first end and a second end, respectively, and where each of the first and second struts is mounted with articulation via their respective first end in a corresponding inner joint on the object. The first strut and the second struts are equipped on each of their second ends with a corresponding outer joint, where the outer joints of the two four-link beams are connected to each other via the connecting links such that a distance between the outer joints is (Continued)

less than a distance between the inner joints, and a first and a second joint axis of each four-link beam lie in or at an angle to a plane defined by a corresponding one of the two four-link beams. A third and a fourth joint axis of each four-link beam lie in the plane is defined by a corresponding one of the two four-link beams. Each of the at least two support structures forms a three-dimensional multi-articulated structure comprising the two four-link beams coupled to each other, and each of the two four-link beams is offset to an inner side in relation to a straight line connecting the outer joints, where each of the connecting links is configured with a bearing surface of a support bearing. Finally, each of the at least two support structures is mounted with articulation relative to the base by the support bearing.

22 Claims, 7 Drawing Sheets

(51) Int. Cl.
*G02B 7/183* (2006.01)
*G02B 23/02* (2006.01)

(58) Field of Classification Search
USPC ............... 359/865, 850, 871, 872, 873, 875
See application file for complete search history.

(56) References Cited

FOREIGN PATENT DOCUMENTS

| | | |
|---|---|---|
| WO | WO 99/38044 A1 | 7/1999 |
| WO | WO 01/65297 A2 | 9/2001 |
| WO | WO 02/084361 A1 | 10/2002 |
| WO | WO 2010/043040 A1 | 4/2010 |

ADJUSTABLE MOUNTING ARRANGEMENT FOR AN OBJECT TO BE POSITIONED PRECISELY RELATIVE TO A BASE

Exemplary embodiments of the present invention relate to an adjustable mounting arrangement to precisely position an object relative to a base, in particular, exemplary embodiments of the invention relate to an adjustable mounting arrangement for a secondary mirror of an optical reflecting telescope.

Optical reflecting telescopes can be designed and used both for receiving optical radiation (for example, a classical telescope) and for transmitting optical radiation (for example, a laser active system).

Most designs of optical reflecting telescopes require a structure that enables, in the region of the aperture thereof, the suspension of a catch mirror (or secondary mirror) corresponding to a main mirror (or primary mirror). Both mirrors have to be very accurately positioned relative to each other so that on the one hand their optical axes are, in an ideal case, exactly coaxial, and on the other hand the adjusted focal distance is as invariable as possible under any environmental conditions. Any modifications to the distance would entail a change of the focusing plane, and any deviations from coaxiality would cause imaging errors or would, in the case of a transmission telescope, degrade the spot quality—that is, for example, would increase the spot radius of a transmitted laser beam.

Large telescope pivot angles in the gravity field of the earth moreover constitute great challenges for the rigidity of the structure, which at the same time has to satisfy high thermal requirements. Depending on the structural concept of the telescope design, a certain amount of shadowing will inevitably be caused by the required connection beams between the main and catch mirrors (primary and secondary mirrors). In the case of transmission telescopes, such as for example beam directing units for high-energy lasers, this problem is more severe in two respects:

- The structural parts shadowing the main mirror would absorb a significant part of the emitted energy, which in the short term leads, due to high temperature gradients, to thermal problems in the structure of the telescope. The reflected fraction in this case also leads lead to harmful scattered light.
- Very high speeds and accelerations during aiming, in conjunction with large alignment angles including overhead pivoting movements, such as for example during target acquisition and tracking, require, apart from the required static rigidity, additional dynamic structural characteristics that are typically in conflict with the aim of achieving minimal shadowing.

PRIOR ART

In order to overcome these problems, it could be contemplated that the catch mirror (secondary mirror) is directly fixed within a glass pane provided at the aperture (entrance or exit aperture) of the telescope. Because such a direct fixing of the catch mirror (secondary mirror) would only be feasible for small telescope structures with small apertures due to material-related and geometry-related rigidity limits, and also due to the limited possibilities of a spatial fine adjustment, currently known solutions generally avoid this problem by means of ensuring that the individual ray paths run between the structural parts, which consequently form sub-apertures. These rays can subsequently be geometrically coupled outside of the telescope, although in this case only a part of the main mirror surface can ever be used. As a result, such telescope structures are not suitable for being linked to a Coudé beam path because the resulting rolling motion of the ray bundles on the mirrors corresponding to the sum of the angle modifications is not possible due to the fixed mounting position of these sub-apertures. To this end, the entire telescope structure would have to co-rotate synchronously, which would lead to considerable additional problems with respect to the achievable aiming dynamics (due to the additional inertia around the roll axis), achievable rigidities (reduction of the rigidity due to additional supports) and achievable accuracies (due to the additional load caused by gyroscopic moments). Moreover, all data and power lines would have to be connected via rotary unions or other transmitters. A full utilization of the main mirror surface would therefore only be achieved by an off-axis arrangement of both mirrors, resulting in considerable manufacturing expense for the mirrors and the related feasibility limits.

All of the described requirements apply in an analogous manner to the realization off-axis telescopes, but with the additional demand that the degree of freedom about the roll axis of the element to be relatively positioned must also be adjustable. In this case, there is also a demand for the ability to make an adjustment in all six degrees of freedom. The problem of shadowing ceases to exist for off-axis optics if all required properties of the adjustment device can be realized in sufficiently small kinematic dimensions.

In other applications, it may also be necessary to mount two objects relative to each other and to position them accurately, for example coaxially, relative to each other.

It is therefore an object of the present invention to provide an adjustable mounting arrangement to precisely position an object relative to a base, in particular for a secondary mirror of an optical reflecting telescope, which makes possible an extremely accurate, reproducible, durable, and robust positioning of the object with little complexity.

This adjustable mounting arrangement according to exemplary embodiments of the invention is provided for an object which is to be precisely positioned relative to a base, in particular for a secondary mirror of an optical reflecting telescope to be precisely positioned relative to a base.

The adjustable mounting arrangement according to the invention has at least two support structures connected to the base and to the object. Each support structure has two identical four-link beams which are arranged nonparallel to each other and which, together with a cradle having two connecting links, form one of the support structures. Each four-link beam has two struts running nonparallel to each other, each of which is mounted with articulation in a joint on the object via a first strut end. The first strut and the second strut are equipped on their respective second ends with an outer joint. The outer joints of both four-link beams are connected to each other via an associated connecting link. The distance between the outer joint of each four-link beam is less than the distance between the joints on the objects. A first and a second joint axis of each four-link beam lie in the plane determined by the four-link beam, or at an angle to this plane. A third and a fourth joint axis of each four-link beam lie in the plane determined by the four-link beam. Each support structure forms a spatial multi-articulated structure comprising the two four-link beams coupled to each other. On its side which is offset to the inner side of the four-link arrangement in relation to the straight line connecting the outer joints, the connecting link is configured with a bearing surface of a support bearing. The support structure is mounted with articulation relative to the base by means of the support bearing.

This construction enables individual struts to deflect upon the application of a force—for example to slightly bend when the resulting bending moment is applied—such that, when the strut is in the deflected position, the direct distance between the two ends of the struts (linear distance) is slightly shortened compared to their distance when the strut is extended straight. This results in a minimal displacement of the object toward this strut. This very sensitive shortening of the effective linear distance between the two ends of the struts is achieved in that the deflection of the strut is used as a type of reduction for the movement by which the force is applied to the strut. The path of movement—that is, the deflection of the strut—is therefore reduced to a change of the linear distance between the two bearings of the strut.

Because the support structure has at least four struts running nonparallel to each other, the object can be optimally positioned in the space. This is because the inclination and the rotational position of the object are also adjustable due to the possibility according to exemplary embodiments of the invention of changing the linear distance between the two ends of each strut.

Preferably, the third and fourth joint axes of each four-link beam, lying in the plane determined by the four-link beam, are the joint axes of the joint on the object end.

In a further preferred embodiment of the mounting arrangement according to the present invention, the struts each have a web-like shape, the areal extension of which is in or parallel to the plane determined by the four-link beam. Such struts have a first width extension which is many times greater than the second width extension in the direction orthogonal to the first width extension. As a result, the strut can be easily bent in the direction transverse to the plane of the first, longer width extension, but has a high resistance to bending in the plane of the first, longer width extension. This enables a defined deflection of the strut in a predetermined direction—specifically in a plane which is perpendicular to the first, longer width extension. In addition, the visible, clear cross-section of the strut, if viewed in the direction of the second, shorter width extension, is very small, such that the strut forms only a very slight shadowing surface for rays running in this direction.

The joints having joint axes which are in the plane determined by the four-link beam are also preferably flexure bearings.

In one preferred embodiment of the present invention, a drivable actuator element is functionally assigned to each strut in such a manner that the actuator element applies a force to the strut which deflects the strut transversely to its longitudinal extension.

Preferably, the actuator element can be actuated by an actuating drive. In this manner, the path of movement of the actuator element, and therefore the change in the linear distance between the two ends of the strut, can be precisely adjusted. In this instance, it is advantageous if the actuator element is a driven element of the actuating drive.

Preferably, the mounting arrangement has at least two, preferably at least three, and more preferably at least four support structures connected to the base and to the object. If in this instance each of the support structures is equipped with the adjustment mechanism according to the present invention for changing the linear distance between the two ends of each strut, a plurality of possibilities for adjusting the position and the orientation of the object accordingly results.

A particularly effective fine-adjustability is achieved in that the struts each have a first end region near the base and a second end region near the object, and in that the actuator element functionally assigned to the same is arranged in such a manner that when actuated it applies the force exerted upon the strut between the two joints of the strut.

Preferably, the force is applied in at least one of the strut end regions near the joint. Not applying the force in the center section of a strut but in its end region near the joint makes it possible to place the drive for adjusting the actuator element at the edge of the mounting arrangement, as a result of which said drive, for example if used in a telescope, does not contribute to a shadowing of rays because the optical apertures remain substantially free. Generally, the actuator elements and their drives can, however, also be arranged in different locations on the respective strut because the force can be applied in principle at any arbitrary position of the respective strut.

It is also particularly advantageous if the actuator element functionally assigned to each strut, or a further actuator element of the strut, preferably also actuatable by an actuating drive, is assigned in such a manner that this actuator element applies to a force to the strut when actuated which exerts a bending moment to the strut. As a result, it is possible not only for the deflection of the strut as described above to occur in the plane extending transversely, in particular at a right angle, to the first, longer width extension, but also for the strut to be twisted on itself in order to minimize, for example, the clear cross-section of the strut for rays extending in a predetermined direction. Also, by applying different forces in a targeted manner to the respective strut of a support structure oriented at an angle in relation to the optical axis of the telescope, a torsion of this support structure or of the struts thereof can be effected, which also results in a minimization of the clear cross-section of the struts for rays running in a predetermined direction.

This minimization of the clear cross-section of the support structure by way of twisting the struts is of particular advantage if the mounting arrangement according to the invention is used in a telescope of a laser active system, because in this case it is possible by such a minimization of the clear cross-section of the individual struts to minimize the strut surface which laser beam rays strike, as a result of which both the heating of the struts and radiation losses are markedly reduced. In this way, flat angles of incidence onto planes formed by the surfaces of the individual struts can be avoided or reduced, which would entail far-reaching and thus particularly harmful scattered light (as opposed to blunt edges or rounded surfaces, where the scattered light diverges within very short distances).

If the actuating drives of all of the actuator elements are connected with a common control unit for transferring actuating signals, the complexity of the adjustment of the position and the orientation of the object, which is caused by the multiplicity of adjustment possibilities of the individual struts, can be reliably mastered.

In a particularly preferred embodiment, the mounting arrangement is provided with a plurality of support structures which form a suspension of a secondary mirror corresponding with a main mirror, wherein the base connected to the support structures is formed by a reflecting telescope housing, wherein the object is formed by a bearing device of the secondary mirror and wherein the secondary mirror can be coaxially adjusted by means of the actuator elements with respect to the main mirror, for example relative to the reflecting telescope axis thereof. This embodiment of the invention is particularly advantageous if the telescope is part of a laser active system emitting radiation. However, exemplary embodiments of the invention can also be used on telescopes receiving radiation, and in this case the catch mirror corresponds to the above-mentioned secondary mirror.

It is advantageous if the struts, which have a web-like shape, of the support structures are arranged in such a way that their planar sides extend in a plane oriented substantially parallel to the reflecting telescope axis. In this respect, shadowing of the rays passing through the telescope by the struts is minimized.

Preferably, the adjustable mounting arrangement has at least three support structures, and the support bearing is a spherical joint bearing or a toe bearing having 3 degrees of freedom.

In one preferred implementation, all kinematic dimensions are selected in such a manner that, even in any arbitrarily deflected state of the adjustable mounting arrangement, all support bearings and all instantaneous centers of rotation are always in one plane, as a result of which the adjustment movements of this mounting arrangement become kinematically possible and are successively implementable in any arbitrary sequence.

Thus, the mounting arrangement according to the present invention creates a "structural concept for radiation passage," minimizing the shadowing problem described at the outset in such a manner that:

resulting scattered light can always be limited to noncritical and predictable intensities owing to the adaptability of the structure, thermal influences due to absorption and to external environmental effects become conceptionally controllable, and the dynamic structural properties for very high movement accelerations are realized within telescope pivot angles of any desired size.

Exemplary embodiments of the invention will be explained in more detail below with reference to the drawings, wherein

DETAILED DESCRIPTION

Figure 1:
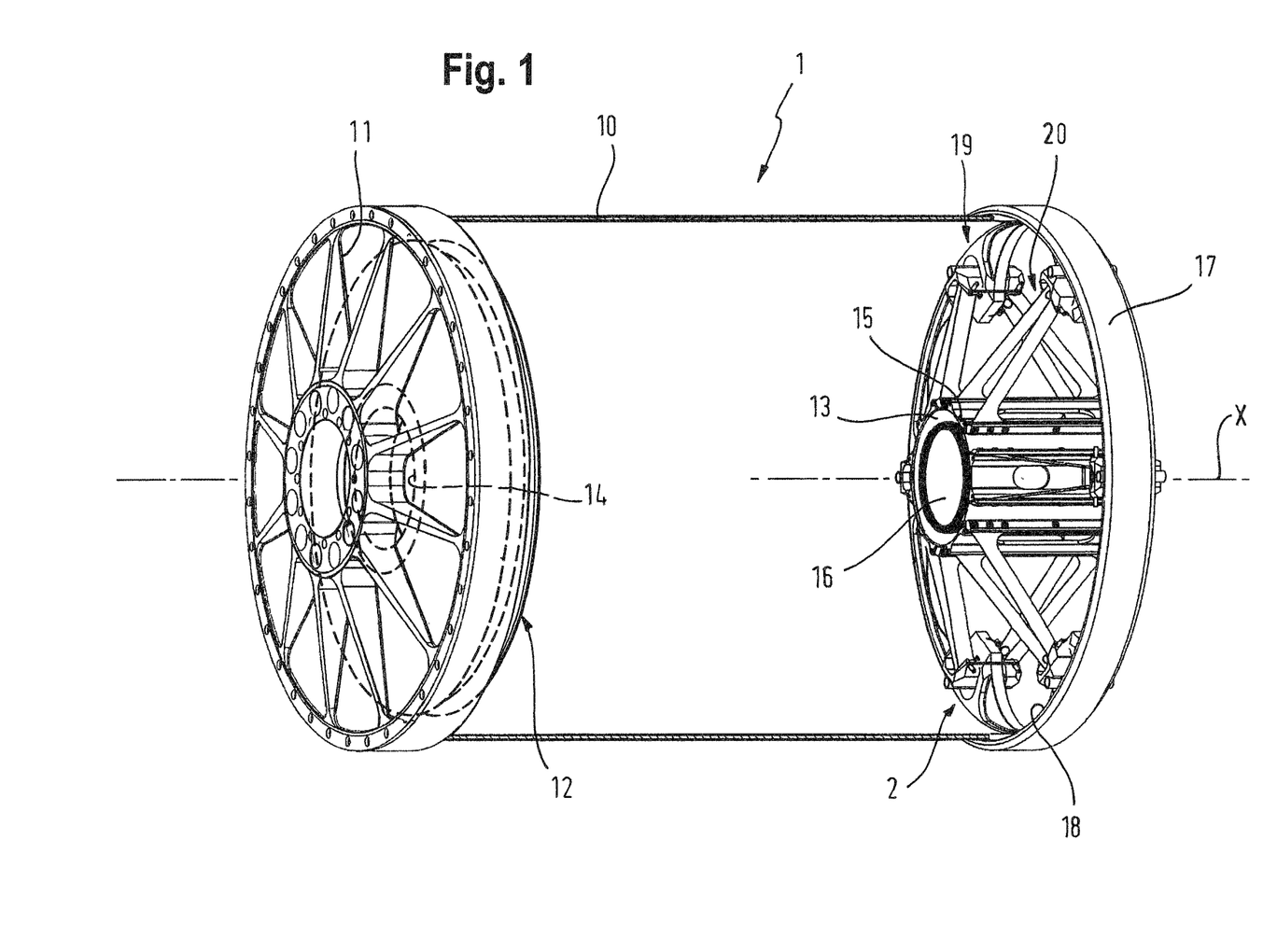
FIG. 1 shows a perspective, partially cutaway view of a telescope equipped with a mounting arrangement according to exemplary embodiments of the invention for the secondary mirror.

FIG. 1 shows a telescope 1 in a partially cutaway perspective view. The telescope 1 has a cylindrical housing 10, on one end of which is arranged, on a support structure 11 fixed to the housing, an annular, concave primary mirror 12, which is also referred to as the main mirror, with a central, first aperture 14. In the region of the other end of the telescope 1, a secondary mirror 16, which is also referred to as a catch mirror, is arranged centrally, and is supported on the cylindrical housing 10 by means of a mounting arrangement 2 according to exemplary embodiments of the invention, and an annular frame 17. The primary mirror 12 and the secondary mirror 16 are coaxially oriented in relation to the longitudinal axis X of the cylindrical housing 10. An annular second aperture 18 surrounds the secondary mirror 16 and is bounded on the outside thereof by the cylindrical housing 10. The housing does not have to be cylindrical; it can, for example in an off-axis telescope, also have a different shape.

The mounting arrangement 2 has a plurality of identically constructed support structures 20—six support structures in FIG. 1—each of which extend between a bearing device 15 of the secondary mirror 16 and a bearing device 19 included on the annular frame 17 connected to the housing 10. The mounting arrangement 2 according to exemplary embodiments of the invention forms a multi-membered kinematic structure mounted with respect to the primary mirror 12 on the housing 10—i.e., fixed to the frame. The construction of the mounting arrangement 2, and in particular of the support structures 20, will be described with reference to FIG. 2 by way of a simplified example with just three support structures 20, 20', 20" which are required as a minimum.

The three support structures 20, 20', 20" are of identical construction, such that only the support structure 20 will be described in detail below; this description analogously also applies to all of the other support structures. An inner cylindrical mount element 13 forms, at its upper end face, the bearing device 15 for the secondary mirror 16, which is not illustrated in any more detail in the example shown. The housing 10 of the telescope 1 and the annular frame 17 with the bearing device 19 are, for reasons of clarity, also only shown in FIG. 2 in sections in the region of the support structure 20".

Figure 2:
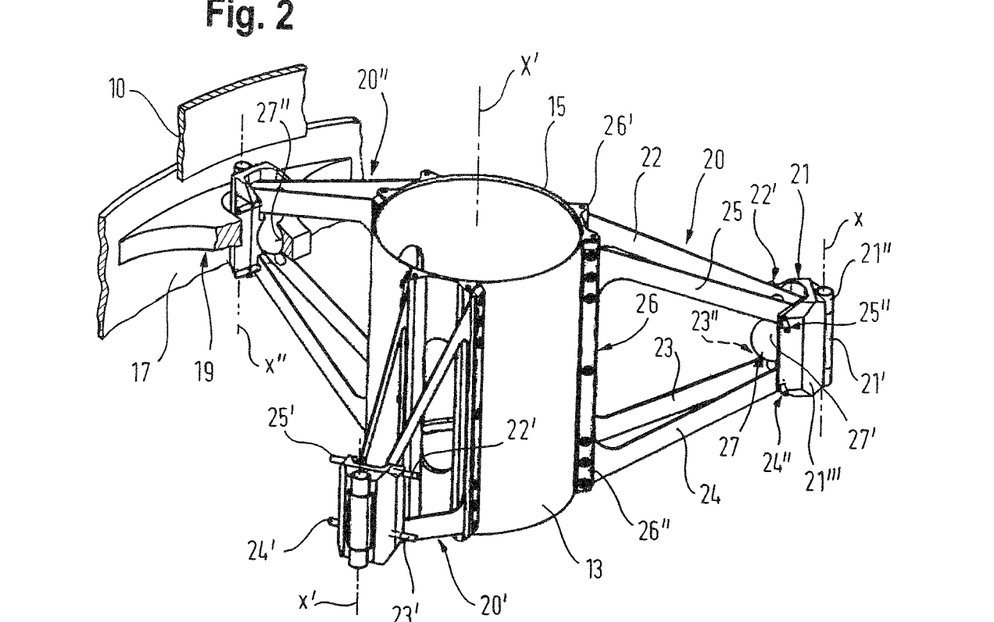
FIG. 2 shows a perspective view of a mounting arrangement according to exemplary embodiments of the invention, having three support structures.

The housing 10 forms a basis for the support structures 20, 20', 20" and the object held by the support structures 20, 20', 22" is, in the example shown, the secondary mirror 16 attached to bracket means 15. The support structures 20, 20', 22" are each pivotably supported on the bearing device 19, functionally assigned to the same, of the annular frame 17 connected to the housing 10 by means of a cradle 21 having a joint. In the case of support structures which are arranged at right angles to each other, the joint of the cradle 21 may in principle be designed as a blade joint with one degree of freedom, provided it is possible to go without the option of scattered light minimization.

In order to avoid this limitation it is, as is also shown in the figures, preferably designed as a spherical joint 27 with three degrees of freedom.

Four struts 22, 23, 24, 25 are attached to each of the cradles 21, which nonparallel to each other radially inwards to an anchoring structure 26 attached to the cylindrical mounting element 13. The struts 22, 23, 24, 25 are, by way of example, formed from an X-shaped sheet metal part which is bent at its center section 21' around a cradle 21 bearing pin 21" which forms a cradle bearing, and is passed through an opening in the cradle body 21''' of the cradle 21. The bearing pin 21" is supported on the radially outer side of the cradle body 21'''. Each support pin has a longitudinal axis x, x', x", which in the non-deflected condition of the support structures extends parallel to the longitudinal axis X of the cylindrical housing 10. On the radially inner side, each cradle 21 has a spherical or semispherical convex bearing surface 27' of the spherical joint 27. A spherical or semispherical concave bearing surface 27" is included on the bearing device 19 as a counter bearing surface, against which the convex bearing surface 27' is supported. If the ball radii are the same, the mounting in this case is a spherical joint mounting. Alternatively, a toe bearing mount would be possible, however with reduced bearing capacity and rigidity properties.

The anchoring structure 26 has two structural beams 26', 26" spaced apart from each other along the circumference of the cylindrical mounting element 13 and extending parallel to the longitudinal axis X' of the cylindrical mounting element 13. The first strut 22 and the second strut 23 are connected, spaced apart from each other on the structural beam 26' in the direction of the axis X', to the first structural beam 26'. The third strut 24 and the fourth strut 25 are connected, also spaced apart from each other in the direction of the longitudinal axis X' of the cylindrical mounting element 13, to the second structural beam 26". In this way, the four struts 22, 23, 24, 25, which extend radially in different directions from the cradle 21, form a spatial structure which, together with the structural beams 26', 26" attached to the cylindrical mounting element 13 and the cradle 21, defines the support structure 20. In this case, the struts 22, 23, 24, 25 are held on the anchoring structure 26 by clamping, and to this end the structural beams 26', 26" have clamping means. The structural beams with the clamping means form the anchoring structure 26.

As can be seen in FIG. 2, the individual struts 22, 23, 24, 25 have a web-like shape, which means that their widthwise extension in a plane parallel to the longitudinal axis X' of the cylindrical mounting element 30 is greater than in a direction that extends parallel to a tangent to the cylindrical mounting element 13 in the region of the associated structural beam 26', 26".

One actuator element 22', 23', 24', 25', the same shown in FIG. 2 for reasons of clarity on the support structure 20', is functionally assigned to each of the struts 22, 23, 24, 25. Each of the actuator elements 22', 23', 24', 25' can be driven by a respectively associated actuating drive 22", 23", 24", 25" in such a way that the actuating element 22', 23', 24', 25' can exert a force onto the lateral surface of an associated strut 22, 23, 24, 25. By exerting such a force onto the strut, this strut can be laterally deflected, wherein for example a bending moment can be applied to the same, so that it can bend out of the plane which extends parallel to the longitudinal axis X' of the cylindrical mounting element 13, and in which the strut extends when elongated. As a result, the linear distance between the end of the strut that is attached to the cradle 21 and the end of the strut that is attached to the associated structural beam 26', 26" is reduced, so that the corresponding point of articulation of the strut on the associated structural beam and thus on the cylindrical mounting element 13 is pulled slightly radially outwards.

The individual support structures 20, 20', 20" consequently have a plurality of very thin strut webs, the same arranged within at least three guide chains formed by the support structures in such a manner that their kinematic dimensions enable, on the one hand, an adjustment of its platform (retaining device 15) at the output end, with the attached connected secondary mirror 16, in all six degrees of freedom (corresponding to a parallel kinematic having the degree of freedom F=6, a "hexapod"), by means of a plurality of more than six actuating drives and, on the other hand, in combination with the plurality of actuating drives exceeding the sixth actuating drive, the pretension and torsion of each individual guide chain can be adjusted due to the fact that so-called "identical degrees of freedom" are established. In this case, one actuating drive is functionally assigned to each strut, and is supported, by means of the cradle 21 mounted by a spherical joint, together with the other actuating drives of the respective guide chain (support structure), on a bearing device 19 configured on a rotationally symmetric support ring 17 fixed to the housing. By itself, this results in a decisive contribution to a controllable minimization of scattered light. The term "identical degree of freedom" is to be understood as a degree of freedom of a kinematic element or of a kinematic guide chain, with no kinematic influence on the transmission function of a higher-order gear arrangement.

Figure 3:
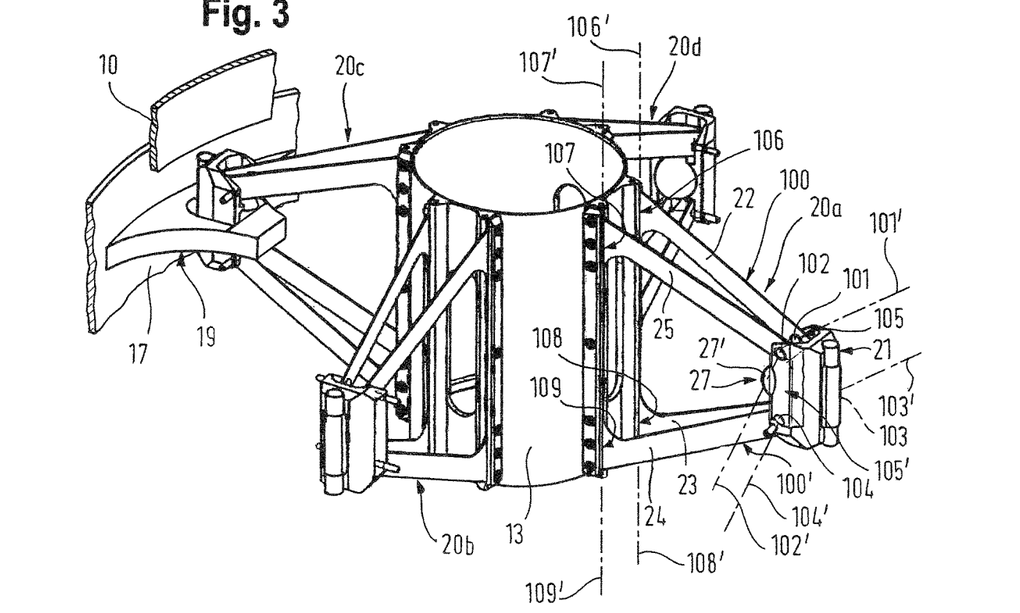
FIG. 3 shows an alternative mounting arrangement, having four support structures.
Figure 4:
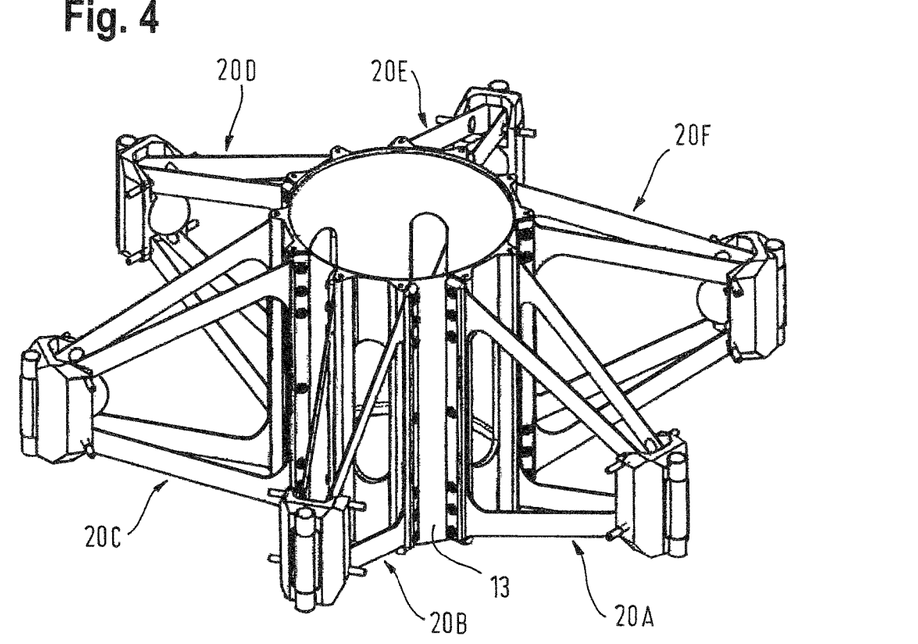
FIG. 4 shows another alternative mounting arrangement, having six support structures.

FIG. 3 shows a mounting arrangement according to the present invention, having four support structures 20a, 20b, 20c, 20d, and FIG. 4 shows the same with six support structures 20A, 20B, 20C, 20D, 20E, 20F, each of which is attached on the cylindrical mounting element 13 at constant intervals from each other around the circumference thereof, and is mounted on the annular frame 17 which is connected to the housing 10 and is fixed to the housing. The construction of the support structures corresponds to that of FIG. 2.

For reasons of clarity, the construction of a support structure is only illustrated in FIG. 3 for the support structure 20a. The remaining support structures 20, 20b, 20c, 20d; 20A, 20B, 20C, 20D, 20E, 20F are nevertheless designed in the same manner. The support structure comprises two identical four-link beams 100, 100', which are arranged nonparallel to each other and which together with the cradle 21, the same having two connecting links 105, 105', form the support structure 20a.

Each of the four-link beams 100, 100' has a first strut 22, 25 and second strut 23, 24, each of which is clamped by its object-end to the structural beam 26', 26", functionally assigned to the same, of the cylindrical mounting element 13. These clamping points each form an object-end joint or inner joint 106, 108, 107, 109 designed as a flexure bearing, wherein each respective joint axis 106', 108', 107' 109' thereof runs parallel to the longitudinal axis X' of the cylindrical mounting element 13 and lies in the plane spanned by the web-like struts 22, 25 or 23, 24 of the respective four-link beam 100, 100'.

At their other ends, the base ends, the struts 22, 25, 23, 24 of each four-link beam 100, 100' are mounted to one of the connecting links 105, 105' functionally assigned to the corresponding four-link beams 100, 100' with articulation by means of one base-end joint or outer joint 101, 103 and/or 102, 104. The joint axes 101', 103', 102', 104' of this base-end joint/outer joint 101, 103, 102, 104 extend at an angle to the plane spanned by web-like struts 22, 25 and/or 23, 24, functionally assigned to the respective joint, of respective four-link beam 100, 100'.

he adjustment mechanism formed according to the present invention for the orientation and positioning of the longitudinal axis X' of the mounting element 13 and, consequently, for the orientation and positioning of the optical axis of the secondary mirror 16 connected to mounting element 13 by means of the retaining device 15 is described in detail below.

Figure 5:
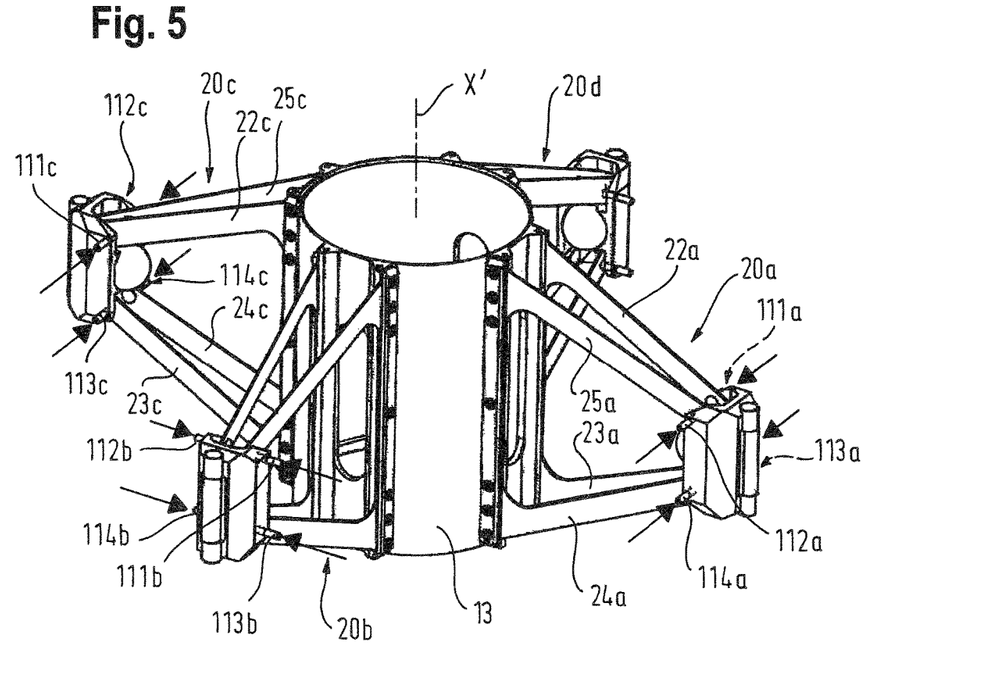
FIG. 5 shows force application points of the actuator elements on the support structures on the example variant from FIG. 3.
Figure 6:
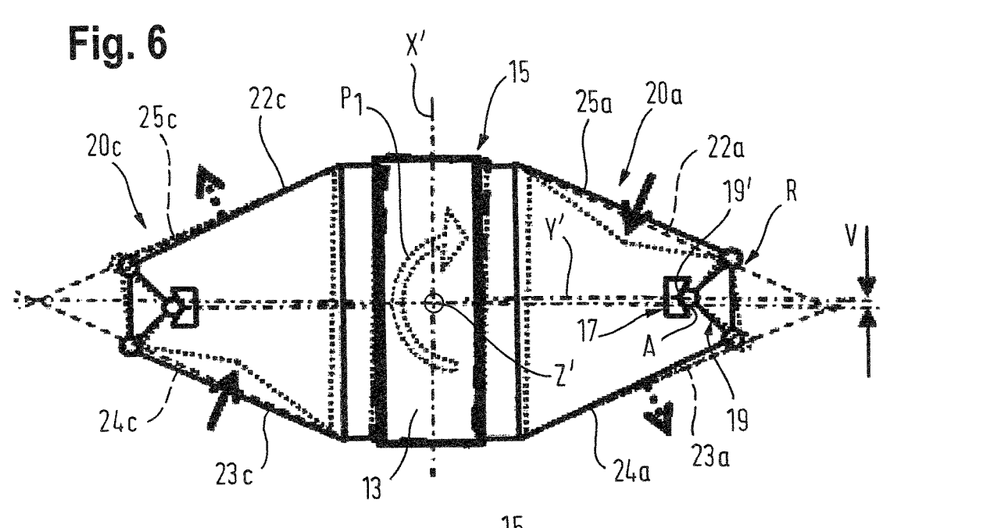
FIG. 6 shows a schematic illustration of two oppositely positioned support structures of a mounting arrangement according to exemplary embodiments of the invention, to explain a laterally-directed deflection of the object.
Figure 7:
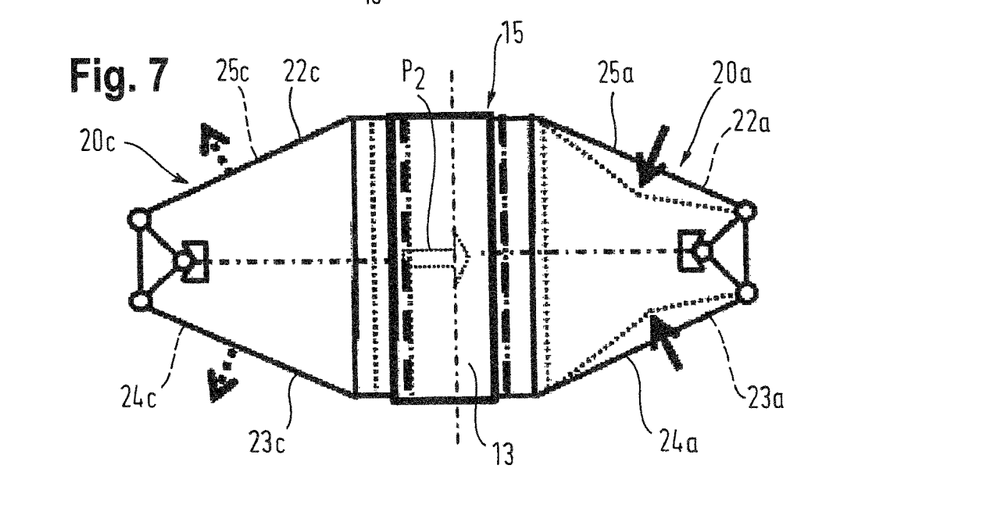
FIG. 7 shows a schematic illustration of two oppositely positioned support structures of a mounting arrangement according to exemplary embodiments of the invention, to explain a tilting of the object.

The adjustment concept further described with reference to FIGS. 5 to 7 is based on the lateral bending deflection, described above, of individual web-like struts by means of the actuator elements driven and movable by an associated actuating drive, starting from a pre-tensioned initial position of the respective, associated strut close to its elongated position (first order singularity). Due to the initially extremely high actuation transmission ratios that can be achieved as a result, a very high sensitivity of the adjustment is achieved, which is particularly error-tolerant in relation to control deviations of the actuating drives and at the same time effects low return forces on the actuating drives.

The individual struts may for example be formed from very thin, longitudinally rigid metal sheets having a sufficient bending elasticity in the transverse direction. Alternatively, arrangements of individual filaments, wires, fabrics or composite materials can be contemplated as struts, which in their initial position each form a thin, planar structure. In this respect, parts of the support structures that form the described kinematic structure can be made of strut elements that are combined to form integral structures, wherein the integral structures form the individual struts.

The kinematic constrained motion of the support structures 20a, 20b, 20c, 20d, which form guide chains, relative to each other, as described below for the embodiment shown in FIG. 3 with reference to FIG. 5, enables the web-like struts to be arranged upright in the direction of the longitudinal axis X, and this arrangement also significantly increases the rigidity of the secondary mirror attachment with respect to the pitch and the yaw axes due to the geometrical moment of inertia. The pitch axis, which is not shown in FIG. 5, and the yaw axis, which is also not shown, are oriented orthogonally relative to each other and also each extend orthogonally to the longitudinal axis X of the telescope, which forms a roll axis. The actuating drives for the actuator elements exerting a bending force on the respective struts, to which reference is made in the functional description following below, are shown in FIG. 5.

The actuating drives always produce deflections at three bending points per strut, in the transverse direction thereof. If the strut bends at the point of engagement of the actuator, the accordingly tensioned strut must likewise have two bending points at its mounting positions. For a straightened strut of a support structure which is not yet deflected, this corresponds to the spanning of a triangle. In FIG. 2, these further bending points would be located on the anchoring structure 26, as well as on the jacketing of the support pin 21' by the central section 21' of the X-shaped metal strut sheet.

Consequently, the bending points constitute one-dimensional solid swivel joints, although the geometry allows the axes of rotation of these solid swivel joints on the actuator drive engagement points to wander in space, albeit with constrained motion. The actuating drives shown in this embodiment are therefore each attached to the strut, assigned to the same, via a spherical joint articulation. Arrangements of rotary thrust joints are also possible at these positions.

The adjustment of the pitch and yaw angles of the retaining device 15 for the secondary mirror 16 (arrow P1 in FIG. 6) are illustrated below with reference to the schematic illustration in FIG. 6, using the example of a spider arrangement having four support structures which form guide chains as in FIG. 5. The pitch and yaw angles are the angles of a swivel movement of the telescope about the pitch axis Y' and about the yaw axis Z', respectively.

If the actuating drives 111a and 112a of the two struts 22a and 25a of the support structure 20a and the actuating drives 113c and 114c of the two struts 23c and 24c of the support structure 20c are advanced in the direction of the arrow, i.e. they exert a force on the respective strut, and if at the same time the actuating elements of the actuating drives 113a and 114a, which are arranged in mirror symmetry, of the two struts 23a and 24a of the support structure 20a as well as 111c and 112c of the two struts 22c and 25c of the support structure 20c are relaxed against the direction of the arrow, a change in the kinematic lengths of the corresponding struts results, as is clarified by the simplified configuration shown in FIG. 6.

However, the deformation of the real geometry of the struts in the transverse direction according to FIG. 5 requires the following two kinematic constrained motions:

1. a spatial displacement of the center of rotation at the engagement point —that is, the web-like struts undergo torsion on both sides of the point of engagement of the actuator element of the actuating drive, and for this reason the actuating drives or the actuator elements must also be attached to the respective strut via a spherical joint articulation if they not only load the strut upon contact, but are also coupled to the same;

2. a kinematic compensation for the displacement V of the center of rotation according to FIG. 6 relative to the contact points A, which can be realized according to exemplary embodiments of the invention proceeding from the known principle of a modified Roberts linkage. This can be accomplished by transferring the functional principle thereof to a spatial linkage, wherein the output point of the Roberts linkage R is then fixed on the frame by a spherical joint bearing. Moreover, the kinematic dimensions thereof must be chosen in such a manner that, including adjustment-related changes to the strut lengths, the vertical deflection of the linkage at the point A (in FIG. 6) exactly corresponds to the amount of displacement V of the center of rotation. This corresponds to the constrained motion requirement according to which the contact points A, A' and the instantaneous centers of rotation B, B' are always in a straight line in every position of two opposite kinematic elements—that is, they lie in the same plane in a three-dimensional arrangement of multiple support structures.

In analogy to the triangle of the planer Roberts linkage R, a pyramid is formed in the three-dimensional linkage, with its point spherically seated on the annular frame 17 in the bearing device 19, wherein the actuating drives 111 to 114 engage with a spherical seat at the further (base) corners thereof. If the constraints above are met, all support structures 20a, 20c and/or 20b, 20d, the same forming guide chains, of the spider mounting arrangement necessarily correspond about the same center of rotation during adjustment of the retaining device 15 for the secondary mirror 16 due to their rotationally-symmetric arrangement. The cradles 21 in this case tilt in the opposite direction of the displacement angle of the retaining device 15 for the secondary mirror 16.

The mounting arrangement having four support structures makes clear that the two support structures arranged orthogonally to each other for the angular adjustment must execute a rotary movement about the contact point 19' of the respective cradle 21, about its axis of symmetry, in order to prevent torsion on these struts. The degree of freedom described above for each individual support structure having a spherical seat attachment to the annular frame 17 also results in the possibility of mounting arrangements being configured with a theoretically unlimited number of support structures—such as six support structures in FIG. 4, for example—wherein at the same time, adjustment movements about the pitch axis and about the yaw axis can overlap in any arbitrary manner. Analogously, tolerances, as well as potential resulting asymmetries, are automatically compensated by the pitch and yaw movements of the cradles adjusting themselves automatically once the mounting arrangement is adjusted.

The horizontal and vertical adjustment of the retaining device 15 for the secondary mirror 16 is performed, in the mounting arrangement shown in the example in FIG. 5, with four support structures in the manner according to the schematic illustration in FIG. 7.

For a lateral parallel shift of the retaining device 15 for the secondary mirror 16 to the right (arrow P2), the four actuating drives 111a to 114a of the struts 22a, 23a, 24a, 25a of the support structure 20a at right in FIG. 7 are synchronously advanced in the direction of the arrow, wherein a deflection (bending force) acting on each strut is increased while the actuating drives 111c to 114c of the struts 22c, 23c, 24c, 25c of the opposite, corresponding support structure 20c are synchronously relaxed in the opposing direction.

This movement is automatically compensated at the orthogonally-disposed support structures 20b, 20d by corresponding rolling movements of the associated cradles (about an axis of the spherical joint). It is clear in this case that the rolling movement of each cradle could be modified to any arbitrary degree, and consequently again compensated, by the lateral offset of the associated actuating drive (advancement of 111b and 113b, as well as yielding of 112b and 114b, with a mirror-image symmetric process at the opposing support structure). In the converse situation, if the actuating drives on the cradles of all support structures (any number thereof) shift laterally with the same orientation, this enables an adjustment of the retaining device 15 for the secondary mirror 16 about its roll axis. This degree of freedom is relevant for the fine adjustment off-axis optics.

The adjustment of the focal distance by coaxial displacement of the retaining device 15 for the secondary mirror 16 relative to the primary mirror 12 along the longitudinal axis (upward in FIG. 5) is enabled by the advancement of all actuating drives (increase in the bending force) on the upper side of the spider mounting arrangement—specifically on the actuating drives 111 and 112—and by the corresponding yielding (reduction of the bending force) of all remaining actuating drives 113 and 114 on the lower end of the mounting arrangement. An accordingly reversed actuation of the actuating drives leads to a coaxial displacement of the retaining device 15 for the secondary mirror 16 in the opposite direction.

The described, spider-form mounting concept enables a sensitive fine adjustment capacity, which is free of play and hysteresis and at the same time very robust and stable over time, for the retaining device 15 for the secondary mirror 16 with respect to all six degrees of freedom, which can also be checked and recalibrated at any time.

Minimization of scattered light also presupposes that all web-like struts can also be adjusted over their entire length parallel to the entering or exiting light bundles of the telescope, which requires, in contrast to the purely parallel kinematics of a hexapod, a sufficiently increased number of linear-dependent actuating members for the drive (that is: a hybrid parallel kinematic arrangement). In the case that deflectability of the exiting light beam can be controlled inside the telescope, for example by a secondary mirror 16 which is gimbal-mounted relative to its retaining device 15, or by other optical components upstream thereof, it must be possible to orient the struts synchronously in angle and phase with the bandwidth and without the intended adjusted configuration of the mounting arrangement changing.

According to exemplary embodiments of the invention, the strut orientation can be realized in an optimum manner as follows, for the purpose of achieving the minimum of shadowing surfaces:

Following the correct adjustment of the retaining device 15 for the secondary mirror 16 coaxial to the optical axis of the primary mirror 12, the radially inner attachments of the struts on the cylindrical mounting element 13 are already oriented parallel to the optical axis of the primary mirror 12, which corresponds to the longitudinal axis. To minimize scattered light in the telescope with a fixed secondary mirror 16, the radially outward attachments, mounted on the annular frame 17, of the combined struts are twisted via the cradles exactly to the set angle of the radially inner attachments of the struts, by means of the four actuating drives functionally assigned to the same. This is achieved according to exemplary embodiments of the invention by a targeted control of the "identical degrees of freedom" mentioned above, by means of the same actuating drives which are also required to realize the degree of freedom for the adjustment. For the support structure 20a shown at right in FIG. 5, this is implemented, by way of example, by advancing the actuating drives 111a and 114a in the same direction, and by relaxing the actuating drives 112a and 113a, or vice-versa —and analogously likewise for all further support structure synchronously. The spatial angular position of each strut at the point of engagement of the spherical seated actuator element is crucial for this, as was described above in the context of the pitch angle adjustment. The planarity of the web-like struts which can be re-established in this way realizes a minimal projection surface relative to the light beam axis, over the entire length of the struts, regardless of the respective adjusted configuration, which makes it possible to entirely prevent critical reflections on the longitudinal sides of the struts.

In an analogous manner, the identical degrees of freedom according to exemplary embodiments of the invention can also be exploited to allow an arbitrary sequence of the adjustment steps, such that, in contrast to a purely parallel kinematics, it is not necessary for all actuating drives to be operated at the same time with time and path synchronicity, according to the translation and transformation matrix. This also enables a hand-operated adjustment, particularly because it is possible to move each actuating element of opposing support structures, which must be moved differently, one after the other, since all kinematic deviations are captured elastically by means of the identical degrees of freedom with respect to the degree of freedom of the actuation, up to the completion of an adjustment step. Once all differential movements of the actuating elements have been correctly executed, the support structure consequently is once more in the same plane as before this adjustment step.

As all necessary adjustment paths enlarge increasingly, the tension on the struts would then also increase slightly. However, this can be adjusted for by a synchronous advancement or yielding of all actuating drives of pairs of opposite support structures; or, the pre-tensioned state of the entire mounting arrangement can be controlled by a collective displacement of all actuating drives. In telescopes with internal ray deflection, the torsion angle of the struts can be overcompensated by means of the same method, in such a manner that the struts in the region of maximum intensity of the ray beam inside the telescope run exactly parallel thereto, and in such a manner that the deviations are simultaneously the greatest at the position where the radiation intensity is the least. At a moderate radiation passage through the struts, the torsion angle which would need to be set at the cradle would correspond, by way of example, precisely to the double of the pitch angle of the light beam transverse to the strut. Due to the relatively low mass inertia of the cradles 21, large bandwidths of the displacement can be realized by the actuating drives in combination with an optimally adapted translation and with sufficient strut pre-tensioning.

A minimum radial pre-tensioning of the struts is indispensable for the adjustability and for the stable use of the illustrated mounting arrangement, and a further increase in this pre-tensioning within the load limits of the struts has an increasingly positive effect both in terms of the robustness with respect to external influences (thermal expansion, vibration, etc.) and in terms of the achievable bandwidth with the actuating drives, as well as external excitations by upstream actuating systems (transverse acceleration when the telescope pivots, etc.). The pre-tensioning states of the mounting arrangement after each adjustment travel can each be advantageously, quantitatively demonstrated by harmonic analysis of the individually excited struts.

A potential telescope construction which includes the hybrid parallel kinematic linkage of the mounting arrangement described above, with the degrees of freedom F=6, as a "spider" with redundant actuating drives to implement six controllable, identical degrees of freedom, can also be analyzed using Gruebler's equation, known to a person skilled in the art, to determine the mobility of spatial mechanisms.

Figure 8:
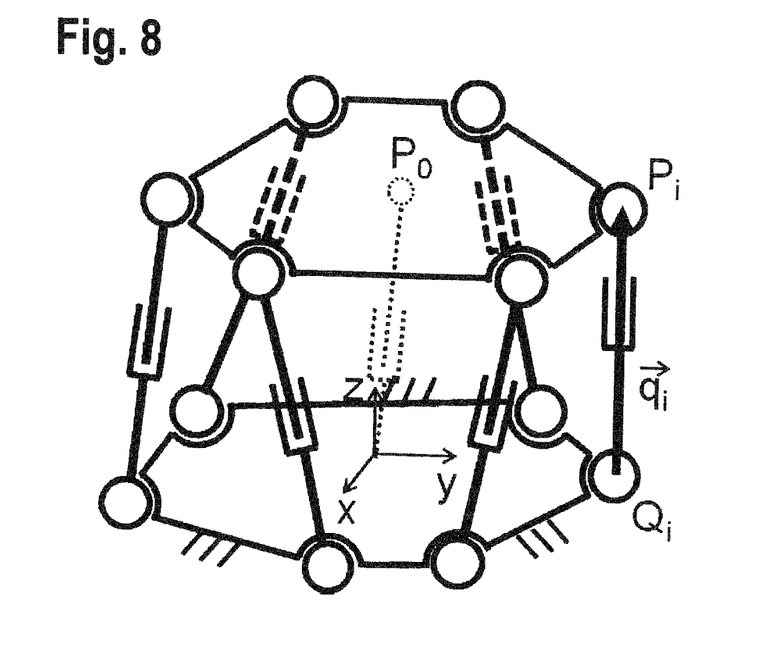
FIG. 8 shows a schematic illustration of a Steward platform.
Figure 9:
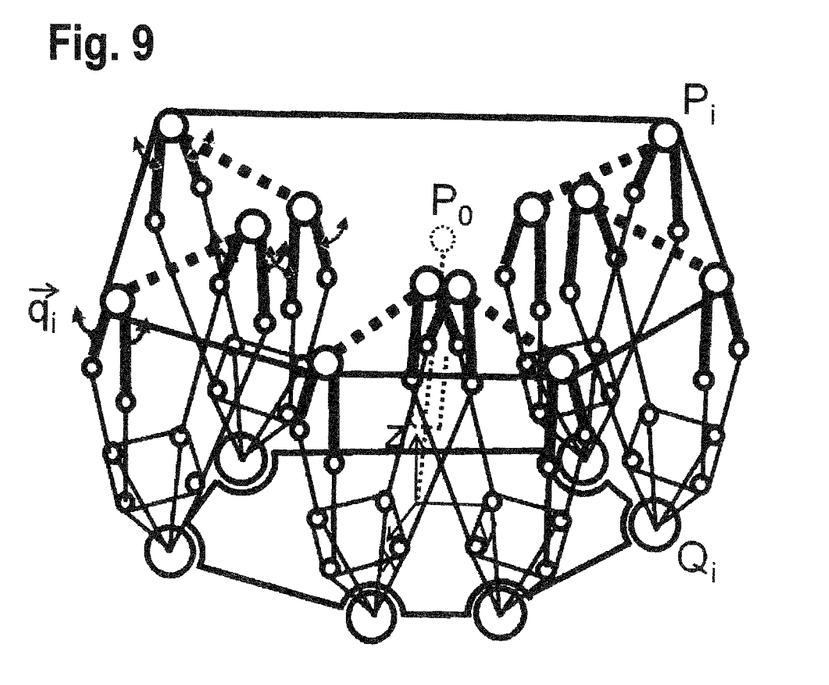
FIG. 9 shows a schematic illustration of a kinematic chain of a mounting arrangement according to the present invention, having six support structures.

For better clarity, this can be converted by way of comparison to a so-called Steward platform shown schematically in FIG. 8, which is assumed to have twelve spherical joints specifically for this case, such that six "identical" and/or "non-restrictive" degrees of freedom (ability of the actuating drives to rotate about their longitudinal axes) are created. Arranging the kinematic chain according to FIG. 9 to make it possible, according to exemplary embodiments of the invention, to implement all of the adjustment options described above, of a spider with six guide chains (support structures), six spherical joints, sixty one-dimensional flexural swivel joints (strut bending), fifty-six members, and six "identical degrees of freedom" at the cradles arrives at the same result, wherein the "identical degrees of freedom" can be controlled specifically by the redundant plurality of actuating drives per support structure.

The invention therefore relates to a mounting arrangement designed as a telescope spider, based on a hybrid parallel kinematic linkage, to achieve a sensitive, fine adjustment capacity, without play or hysteresis, of the secondary mirror holder in optical reflecting telescopes in all six degrees of freedom, wherein the guide chains (support structures) fixed on the catch mirror holder thereof each have four web-like struts which are wide relative to their thickness, wherein exactly one actuating drive is functionally assigned to the same, said actuating drive being supported together with the other struts of the same guide chain against the cradle which is spherically seated on the bearing element of the annular telescope frame.

The principle of this telescope spider is likewise suitable for the adjustment of off-axis lenses, wherein any arbitrary arrangement of the kinematic structure outside of the telescope apertures can also be contemplated.

The ability of the spider-form mounting arrangement to allow the passage of rays is based on particularly thin, web-like struts, to prevent or reduce scattering, the orientation of said struts being individually controllable with each support structure, independently of the adjusted configuration of the telescope spider. This makes possible a minimization of the projection surfaces as a direct comparison against the adjusted configuration of the retaining device 15 for the secondary mirror 16 (as a necessary boundary condition for the same).

The control method described above for orienting the web-like struts is also suitable for telescopes with integrated optoelectronic ray deflection of higher bandwidths, as described previously, wherein the boundary conditions necessary for this can be derived directly from commanding the optoelectronic actuating system and evaluating the resulting deflection of the light beam, then transformed and overlapped with synchronous phase with the commands to the actuating drives of the cradles.

The minimization of scattered light is controlled by the same actuating drives which are used for the adjustment of the secondary mirror suspension (retaining device 15), wherein the actuating movements for each support structure implemented in this case then specifically exploit the "identical degrees of freedom" of the kinematic arrangement. This achieves independence between the adjusted configuration of the retaining device 15 and the current orientation of the struts.

The radially symmetric pre-tensioning of all struts, combined with the advantageous adaptability of their thermal expansion coefficients and the geometric similarity of the support structures in the radially symmetric and axially symmetric arrangement results in a mechanically and thermally robust design with high long-term stability. The wide range of possible pretensions which can be set also makes the mounting arrangement dynamically adaptable with respect to components which will be received by the retaining device 15 for the secondary mirror 16.

A very favorable mass/rigidity ratio is achieved by the capacity to precisely execute the kinematically constrained motion due to a compensation of the displacement of the center of rotation, owing to the kinematically warpless, evenly pre-tensioned, web-form struts arranged upright to the direction of acquisition. The dynamic rigidity achieved as a result, and the resulting high resonance frequencies of the secondary mirror holder as a whole, including the mounting arrangement according to exemplary embodiments of the invention, enables extremely high accelerations of the telescope for acquisition movements, while simultaneously preserving high optical quality. This dynamic robustness likewise enables large bandwidths of the actuating drives for the adjustment, as well as for the actuating systems fixed to the retaining device 15 for the secondary mirror 16.

The mounting arrangement designed as a telescope spider can theoretically have an arbitrary number of support structures (however, at least two), although it obtains greater isotropic rigidity properties as this number increases. As a result, beyond just the possibility of achieving very high accelerations for acquisition movements, there is also the capacity to set any arbitrary telescope pivot angle for full spherical coverage (flip-over capability in the earth's gravitational field), while still preserving high optical quality.

It is possible to control the calibration of the adjustment of the mounting arrangement and the minimization of light scattering, either continuously by means of a regulator, for example, and/or in intervals by means of a control device, for example.

If the actuating drives have self-limiting properties at their outputs, it is optionally possible to dispense with fixing brakes (resulting in a secured arrangement when shut-down for transport, and also in the event of damage).

If a sensor system is integrated on the retaining device 15 for the secondary mirror 16, for the adjustment of the telescope construction, a self-calibration can be carried out at any time using this mounting arrangement.

The tensioning of the individual struts can be checked and monitored at any time using harmonic analysis. Each actuating drive functionally assigned to the respective strut could provide the pulse necessary for the analysis.

The actuating drives configured on the cradles for the actuating elements are advantageously arranged near the annular frame 17 to which the support structures are attached, such that the electrical connections thereof can be made outside of the annular optical aperture 18.

The individual struts have an advantageously electrically conductive design, thereby making it possible to compensate the electrical potential to the retaining device 15 for the secondary mirror 16, on the one hand, and on the other hand also to achieve a power supply via the remaining struts with respect to this potential, to actuating systems for the secondary mirror, said systems installed in the retaining device 15 for the secondary mirror 16.

The geometric relationships in the adjustable mounting arrangement according to exemplary embodiments of the invention are described below with reference to FIGS. 10 to 14.

The adjustment procedure involves finely positioning the cylindrical retaining element 13 relative to the annular frame 17 in all six degrees of freedom.

Figure 10:
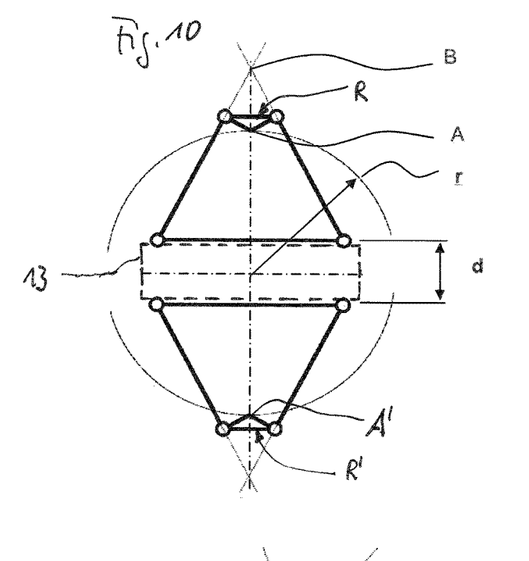
FIG. 10 shows a simplified mechanical scheme of kinematic chains of two support structures located opposite each other, in a neutral, non-deflected state.

FIG. 10 shows the unstressed, neutral position of a simplified mechanical scheme of two opposite support structures which each form, by means of their four-link beams, a three-dimensional four-bar linkage Proceeding from the principle of the Roberts linkage known in the domain of four-link beams for configuring proximate straight line mechanisms, the kinematic dimensions thereof are initially modified, to implement the kinematic chain provided in exemplary embodiments of the invention, in such a manner that the point A, A' of the respective coupling triangle R, R' describes an approximated circular path, the radius r of which is equal to the distance separating the contact points A, A' which correspond to the center of the respective spherical joint 27 which bears the respective support structure 20 on the annular frame 17.

At least two such arrangements, which constitute kinematic chains, and which must still be modified according to the description below, are arranged in pairs in a star pattern around the cylindrical retaining element 13. Each of these pairwise arrangements forms, as described above, the essential part of a support structure 20 in conjunction with further components.

Figure 11:
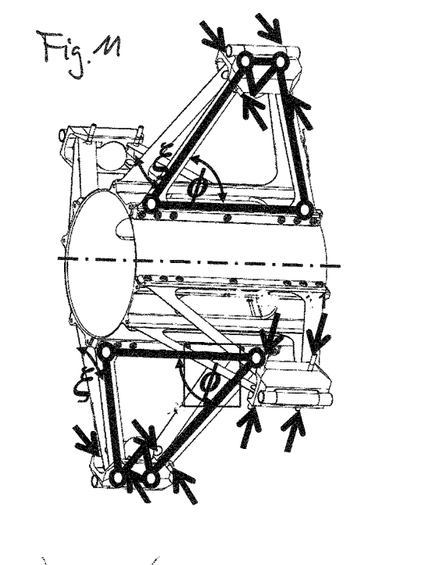
FIG. 11 shows an illustration according to FIG. 5, with emphasized kinematic chains according to FIG. 10.

The angle of the pairwise arrangement (the angle at which the two four-link beams of a support structure are arranged with respect to each other), illustrated in FIG. 11, is advantageously selected in such a manner that there is a rotation-proof connection between the cylindrical retaining element 13 and the annular frame 17. The respective lateral projections of this arrangement are effectively the kinematic dimensions in this case.

The kinematic synthesis of the support structure requires that the distance d of the attachments on the retaining element 13, corresponding to the pivot radius r, needs to be selected such that, in conjunction with the strut angle Φ (the inclination of the struts relative to the straight-line connection of the associated joints at the object end), it is possible to simultaneously meet all of the kinematic constraints named below.

Figure 12:
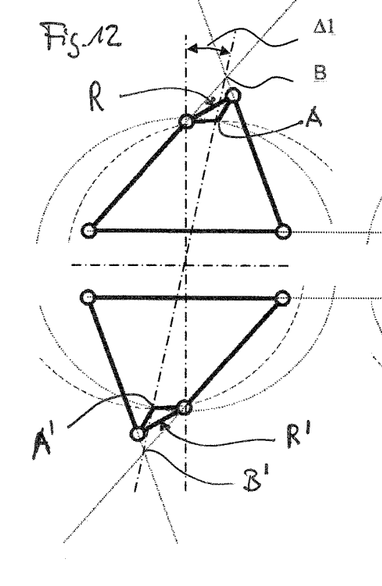
FIG. 12 shows the scheme of FIG. 10 in a deflected state.

FIG. 12 shows a deflected position of the illustrated planar kinematic arrangement, without constant strut lengths. The intersection points B, B' of the extensions of the struts of the four-bar linkage show the position of the instantaneous center of rotation, wherein the coupling triangles R, R' rotate at the given instant about the same. In the illustrated kinematic arrangement, in which the annular frame 17 needs to be positioned relative to the retaining element 13, this instantaneous center of rotation (intersection point B, B') inscribes the so-called fixed centrode as the displacement angle increases. In the opposite case, in which the annular frame 17 of the telescope is the frame element and the retaining element 13 will be positioned relatively, the instantaneous center of rotation inscribes the so-called moving centrode, which is different from the fixed centrode because the coordinate system of the diagram moves with the same.

The device described here constitutes the special case in which, as illustrated in FIG. 12, in every position of two opposite kinematic arrangements, the contact points A, A' and the instantaneous centers of rotation B, B' are always in a straight line—that is, they lie in the same plane when multiple support structures are arranged in three dimensions. If this condition is met kinematically, this also applies analogously for similar arrangements with struts which have variable lengths, as symbolically illustrated in FIG. 13 by the double arrows next to the struts. Given this prerequisite, it is possible to reach the maximum of the achievable actuating path of the adjustment device with respect to its kinematic dimensions.

The strut length must change differentially with respect to the annular frame 17 for the rotational displacement of the retaining element 13. This means that the elongation of one strut by the value+δL must equal the shortening of the corresponding (mirror-image) strut of the opposite support structure by the value −δL, wherein the opposite support structures must be displaced in a mirror-image movement. Deviations therefrom necessarily lead, according to the plane, to two translational degrees of freedom for positioning between the retaining element 13 and the annular frame 17.

The remaining adjustment options achieve a coaxial displacement and a roll movement as described above in the description of the arrangement of the actuating drives.

Figure 13:
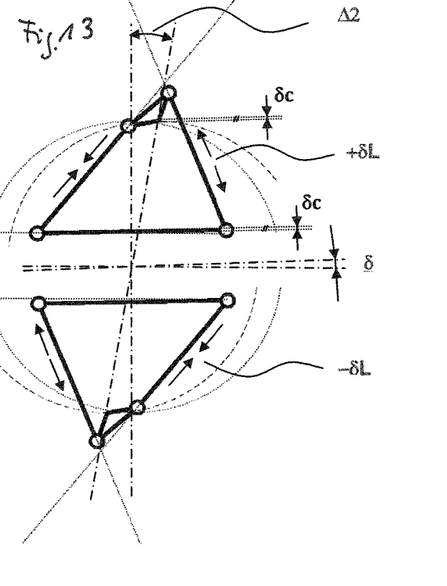
FIG. 13 shows the scheme of FIG. 12, having struts of modified length.

As can be seen in FIG. 13 as well, the circular paths of the two opposite kinematic arrangements move apart in opposite directions when the strut lengths change, which would be equivalent to an increase in the distance of the opposite contact points A, A' by 2×δc.

In the design of the kinematic dimensions described here, the distance d of the tilting of the inner lines (the straight connecting lines of the joints at the object end) caused by the struts changing length would increase by δ. However, because both the outer annular frame 17, with its bearing devices 19, and the retaining element 13 each constitute rigid bodies in the form of the two objects being positioned relative to each other, these distances exactly cancel each other out. As such, in the opposite situation, the kinematics ensures that the frame dimensions between the retaining element 13 and the annular frame 17 remain unchanged.

Consequently, a tilting movement between the retaining element 13 and the annular frame 17 is only possible if the values for δc in FIG. 13 are the same. In other words, this ensures that each support structure always moves the element, the same being displaced rotationally, about the same center of rotation regardless of its momentary deflection, such that it is never possible to encounter blocked positions in the positioning device described herein when any number of adjustment movements (rotational and translational) are overlapped.

Figure 14:
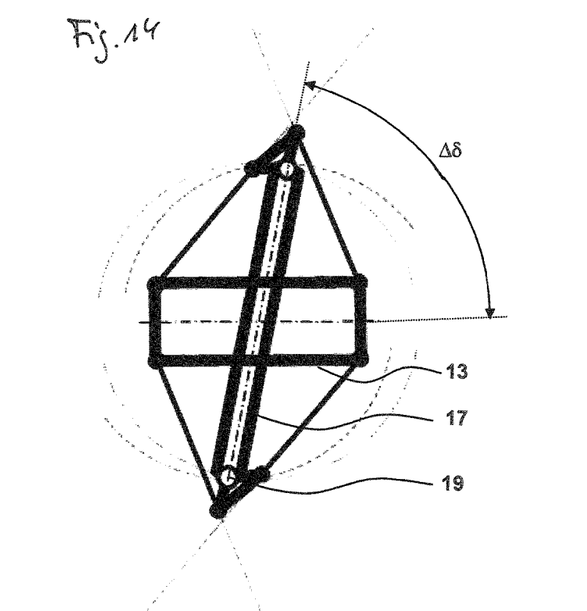
FIG. 14 shows a schematic side view of two support structures located opposite each other, in connection with two objects to be positioned relative to each other, in a deflected state.

As shown in FIG. 14, the achievable radian measure corresponds to the kinematically achievable tilt angles $\Delta\delta=\Delta2+\delta$ between the two objects being positioned relative to each other—the retaining element 13 and the annular frame 17—according to the scale of the construction, which correspond at every order of magnitude to the possible translational movements.

The special case for the technical design described above also allows the motion freedoms if the swivel joints of the four-bar linkage in the illustrated planar kinematics are blocked. Kinematically, this corresponds to a subtraction $\Delta=\Delta1-\Delta2+\delta$ (FIGS. 12 and 13). This kinematic condition achieves the possibility of arranging the strut webs on edge, which is particularly advantageous with regards to high rigidity and the ability to allow the passage of a light beam. This is illustrated in FIG. 11 and in FIGS. 2 to 5.

If a right-angle arrangement of the axes of this swivel joint relative to the longitudinal axis of the strut blocks the swivel joints of the planar kinematic arrangement described previously, this results in a particularly advantageous option for implementing the change in strut length. When strut webs are used, this mobility perpendicular to the kinematic plane advantageously coincides with the propensity of each strut to bend transverse to its longitudinal extension, such that the flexure bearings (the center of curvature of the strut flexion) created as a result automatically arise near to the mounting point of the struts, the same tensioned in the longitudinal direction. Accordingly, it is also possible to arrange the actuating drives 11 alongside the struts in such a manner that they can apply their actuating force transverse to the longitudinal extension of the struts as the force which deflects the struts. Due to this approach to deflecting the struts, the tilting resistance and axial rigidity of the described device is essential unaffected, regardless of the respective adjusted configuration, due to the essentially kinematic independence (owing to the high bending resistance of the strut arranged on edge) of the attached actuating drives. In addition, this makes possible the ability of the struts to be displaced out of their pre-tensioned straight position in the longitudinal direction an extreme actuating translation between the actuating drives 11 and the platform at the output end (the retaining element 13 or the annular frame 17) within the smallest constructed space, which enables the highest precision for a displacement, free of play and hysteresis, at the driven input, on the one hand, and on the other hand achieves the robustness at the output end with respect to disturbance values at the output. This is because there is hardly any feedback effect on the actuating drives.

Where the support structures 20 are arranged in a four-arm pattern, as shown in FIG. 3, FIG. 5, and FIG. 11, the movements of the associated actuating drives 11 for small actuating angles can be essentially linearly correlated independently of the gimbal angles at the output. This significantly simplifies the manual adjustability, as described below.

A further feature of this invention is the targeted usability of so-called "identical degrees of freedom" of the overall kinematic arrangement. This means all degrees of freedom which do not influence the position between the input and output platforms, such as the rotational freedoms of the six struts, the same able to change their length, about their longitudinal axes, as in FIG. 8. In contrast to purely parallel structures (hexapods with six linearly independent actuating drives), the movement of which requires the simultaneous actuation of all actuating drives with time- and path-synchronous controls, exemplary embodiments of the invention realizes a "hybrid parallel kinematics" with more than six linearly dependent actuating drives. However, the likewise preserved, six identical degrees of freedom in the structural scheme shown in FIG. 9 can be specifically controlled and/or regulated in this case by linear combination of the redundant plurality of actuating drives. Consequently, the possibility which thereby arises of assigning one actuating element to each strut also allows a torsion movement of each individual support structure 20 by means of, in each case, four actuating drives actuated in opposing directions.

This torsion movement achieves the collective orientation of all strut webs in each support structure, which can be exploited for:

minimizing shadowing and light scattering by setting the strut webs parallel to the direction of emission and/or reception of light in the telescope in cases where light beams must pass through the support structures, enabling a manual and/or remote-controlled adjustment sequence without the need for the same to be performed with chronological and path synchronicity. The required kinematic compensation in this case is performed via the ability of the strut webs to undergo torsion, which accordingly has no feedback effect on the adjusted configuration. This in turn allows a reset at any time to the state of minimum strut tensioning once all adjustment steps have been carried out, and/or enables another desired position (such as a position to minimize light scattering).

Figure 15:
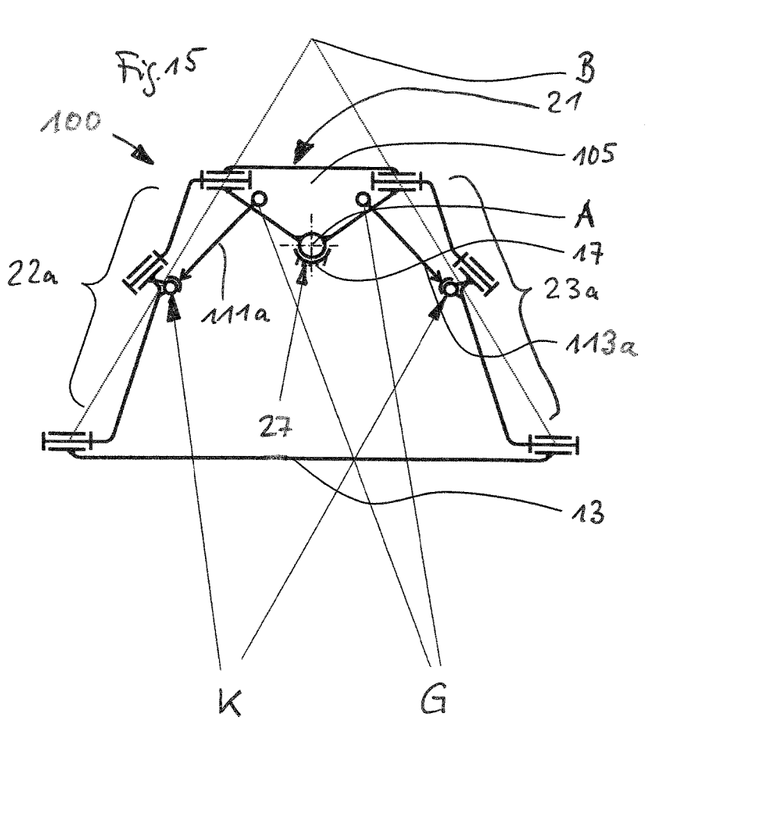
FIG. 15 shows a kinematic scheme of the spatial kinematics of a four-link beam.

FIG. 15 shows, by way of example, a kinematic scheme of the three-dimensional kinematics of the four-link beam 100 which forms, together with the four-link beam 100', the support structure 20a. Analogous designs also apply to the other four-link beams. The points of engagement of the actuating drives 111a and 113a at the struts 22a and/or 23a to which they are assigned can be considered as spherical joints K with three degrees of freedom in the model. The same is true for the spherical joint 27. The attachments of the actuating drives 111a and 113a to the cradle 21 (or alternatively to the annular frame 17) can be spherical joints with three degrees of freedom, or swivel joints with one degree of freedom. The other joints in the four-link beam 100 are swivel joints with one degree of freedom.

The reference numbers in the claims, the description, and the drawings only serve the purpose of clarification of the invention, and shall not restrict the scope of protection.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

The invention claimed is:

1. An adjustable mounting arrangement to position an object of an optical reflecting telescope relative to a base, comprising:
   at least two support structures connected to the base and to the object, wherein each of the at least two support structures has two four-link beams arranged nonparallel to each other and a cradle having two connecting links;
   wherein each of the two four-link beams has a first strut and a second strut running nonparallel to each other, wherein each of the first and second struts have a first end and a second end, respectively, wherein each of the first and second struts is mounted with articulation via their respective first end in a corresponding inner joint on the object;
   wherein the first strut and the second struts are equipped on each of their second ends with a corresponding outer joint, where the outer joints of the two four-link beams are connected to each other via said connecting links;
   wherein a distance between the outer joints is less than a distance between said inner joints;
   wherein a first and a second joint axis of each four-link beam lie in or at an angle to a plane defined by a corresponding one of the two four-link beams;
   wherein a third and a fourth joint axis of each four-link beam lie in said plane defined by a corresponding one of the two four-link beams;
   wherein each of the at least two support structures forms a three-dimensional multi-articulated structure comprising the two four-link beams coupled to each other;
   wherein, each of the two four-link beams is offset to an inner side in relation to a straight line connecting the outer joints, wherein each of the connecting links is configured with a bearing surface of a support bearing;
   wherein each of the at least two support structures is mounted with articulation relative to the base by the support bearing;
   wherein four struts are attached to each of the cradles, said four struts running nonparallel to each other radially inwards to an anchoring structure attached to the cylindrical mounting element;
   wherein the anchoring structure has two structural beams spaced apart from each other along the circumference of the cylindrical mounting element and extending parallel to the longitudinal axis of the cylindrical mounting element;
   wherein the first strut and the second strut are connected, spaced apart from each other on the structural beam in the direction of the axis, to the first structural beam;
   wherein the third strut and the fourth strut are connected, also spaced apart from each other in the direction of the longitudinal axis of the cylindrical mounting element, to the second structural beam; and
   wherein the struts are clamped on the anchoring structure.

2. The adjustable mounting arrangement according to claim 1, wherein the third and fourth joint axes of each four-link beam, lying in the plane defined by the corresponding one of the two four-link beams, are the joint axes of said inner joints.

3. The adjustable mounting arrangement according to claim 2, wherein the each of the first and second struts has a web-like shape, the planar extension of which is in or parallel to the plane defined by corresponding one of the two four-link beams.

4. The adjustable mounting arrangement according to claim 2, wherein the inner joints having the third and fourth axes, which are in the plane defined by the corresponding one of the two four-link beams, are flexure bearings.

5. The adjustable mounting arrangement according to claim 2, wherein a drivable actuator element, assigned to each of the first and second struts, is configured to apply a force to a corresponding one of the first and second struts which deflects such one of the first and second struts transversely to a longitudinal extension of such one of the first and second struts.

6. The adjustable mounting arrangement according to claim 5, wherein the drivable actuator element is configured to be driven by a drive element of an actuating drive.

7. The adjustable mounting arrangement according to claim 1, wherein the each of the first and second struts has a web-like shape, the planar extension of which is in or parallel to the plane defined by corresponding one of the two four-link beams.

8. The adjustable mounting arrangement according to claim 7, wherein a drivable actuator element, assigned to each of the first and second struts, is configured to apply a force to a corresponding one of the first and second struts which deflects such one of the first and second struts transversely to a longitudinal extension of such one of the first and second struts.

9. The adjustable mounting arrangement according to claim 8, wherein the drivable actuator element is configured to be driven by a drive element of an actuating drive.

10. The adjustable mounting arrangement according to claim 1, wherein a drivable actuator element, assigned to each of the first and second struts, is configured to apply a force to a corresponding one of the first and second struts which deflects such one of the first and second struts transversely to a longitudinal extension of such one of the first and second struts.

11. The adjustable mounting arrangement according to claim 10, wherein the drivable actuator element is configured to be driven by a drive element of an actuating drive.

12. The adjustable mounting arrangement according to claim 11, wherein each of the actuating drives of the actuator elements are connected to a common control or regulating unit configured to transmit actuating signals.

13. The adjustable mounting arrangement according to claim 10, wherein
   each of the first and second struts has a first end region near the base and a second end region near the object, and
   the drivable actuator element, assigned to a corresponding one of the first and second struts, is configured to apply said force between two joints of the corresponding one of the first and second struts.

14. The adjustable mounting arrangement according to claim 13, wherein the drivable actuating element, assigned to a corresponding one of the first and second struts, or a further drivable actuator element, is configured to apply a force to the corresponding one of the first and second struts which exerts a bending moment on such strut.

15. The adjustable mounting arrangement according to claim 10, wherein the drivable actuating element, assigned to a corresponding one of the first and second struts, or a further drivable actuator element, is configured to apply a force to the corresponding one of the first and second struts which exerts a bending moment on such strut.

16. The adjustable mounting arrangement according to claim 10, wherein the mounting arrangement is configured with more than two support structures which form a suspension of the object corresponding to a primary mirror of the optical reflecting telescope,
- wherein the base connected to the support structures is formed by a mirror telescope structure,
- wherein the object is formed by a retaining device of a secondary mirror of the optical reflecting telescope, and
- wherein the secondary mirror can be adjusted relative to the primary mirror by of the drivable actuating elements.

17. The adjustable mounting arrangement according to claim 16, wherein each of the first and second struts has a web-like construction and are arranged such that their planar sides extend in a plane oriented substantially parallel to a mirror telescope axis of the optical reflecting telescope.

18. The adjustable mounting arrangement according to claim 1, wherein the mounting arrangement has at least three support structures connected to the base and to the object.

19. The adjustable mounting arrangement according to claim 18, wherein the drivable actuating element, assigned to a corresponding one of the first and second struts, or a further drivable actuator element, is configured to apply a force to the corresponding one of the first and second struts which exerts a bending moment on such strut.

20. The adjustable mounting arrangement according to claim 1, wherein the mounting arrangement has at least four support structures connected to the base and to the object.

21. The adjustable mounting arrangement according to claim 1, comprising at least three support structures, and wherein the support bearing is a spherical joint bearing or a toe bearing having three degrees of freedom.

22. The adjustable mounting arrangement according to claim 1, wherein all kinematic dimensions of the adjustable mounting arrangement are such that, even in any arbitrarily deflected state of the adjustable mounting arrangement, all support bearings and all instantaneous centers of rotation are always in a single plane, as a result of which the adjustment movements of the adjustable mounting arrangement become kinematically possible and can be executed in any arbitrary sequence one after the other.

* * * * *